(12) United States Patent
Guo et al.

(10) Patent No.: US 12,315,224 B2
(45) Date of Patent: May 27, 2025

(54) OBJECT DETECTION METHOD AND ELECTRONIC APPARATUS

(71) Applicant: National Taiwan University of Science and Technology, Taipei (TW)

(72) Inventors: Jing-Ming Guo, Taipei (TW); Jr-Sheng Yang, Taipei (TW); Hung-Wei Wu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 392 days.

(21) Appl. No.: 17/896,082

(22) Filed: Aug. 26, 2022

(65) Prior Publication Data

US 2024/0005635 A1    Jan. 4, 2024

(30) Foreign Application Priority Data

Jun. 30, 2022   (TW) .................................. 111124468

(51) Int. Cl.
*G06K 9/00*    (2022.01)
*G06T 3/4007*    (2024.01)
*G06V 10/766*    (2022.01)
*G06V 10/77*    (2022.01)

(52) U.S. Cl.
CPC .......... *G06V 10/766* (2022.01); *G06T 3/4007* (2013.01); *G06V 10/7715* (2022.01)

(58) Field of Classification Search
CPC .. G06V 10/766; G06V 10/7715; G06V 10/82; G06T 3/4007; G06N 3/082; G06N 3/0464; G06N 3/096
See application file for complete search history.

(56) References Cited

U.S. PATENT DOCUMENTS

| 10,679,351 B2 | 6/2020 | El-Khamy et al. |
| 11,244,191 B2 | 2/2022 | Yao et al. |
| 2020/0175384 A1* | 6/2020 | Zhang ................... G06N 3/088 |

(Continued)

FOREIGN PATENT DOCUMENTS

| CN | 113052006 | 6/2021 | |
| CN | 113139543 A * | 7/2021 | ........... G06F 18/214 |

(Continued)

OTHER PUBLICATIONS

Xiang Li, "Generalized Focal Loss V2: Learning Reliable Localization Quality Estimation for Dense Object Detection" (Year: 2020).*

(Continued)

*Primary Examiner* — Dhaval V Patel
(74) *Attorney, Agent, or Firm* — JCIPRNET

(57) ABSTRACT

An object detection method and an electronic apparatus are provided. A processor is configured to perform the following. An original image is received. A plurality of initial feature layers of different scales is extracted from the original image. A plurality of fused feature layers of different scales is obtained through an interpolation and an addition operation based on the initial feature layers. The fused feature layers are respectively input into corresponding detection heads to obtain a bounding box location probability distribution through a bounding box regression branch of the detection head and obtain a classification probability distribution through a classification branch of the detection head.

10 Claims, 4 Drawing Sheets

(56) References Cited

U.S. PATENT DOCUMENTS

2021/0370993 A1 12/2021 Qian et al.
2023/0106961 A1* 4/2023 Hassan ................ G06N 3/0464
                                                                  348/135
2024/0193923 A1* 6/2024 Wang ................... G06V 10/454

FOREIGN PATENT DOCUMENTS

CN   113989852   1/2022
TW   M610453    4/2021

OTHER PUBLICATIONS

Jing-Ming Guo et al., "A Light-Weight CNN for Object Detection with Sparse Model and Knowledge Distillation", Electronics, Feb. 14, 2022, Grace Period Disclosure, pp. 1-13.
Changqing Cao et al., "An Improved Faster R-CNN for Small Object Detection", IEEE Access, Aug. 2, 2019, pp. 106838-106846, vol. 7.
"Office Action of Taiwan Counterpart Application", issued on Feb. 24, 2023, p. 1-p. 18.

* cited by examiner

OBJECT DETECTION METHOD AND ELECTRONIC APPARATUS

CROSS-REFERENCE TO RELATED APPLICATION

This application claims the priority benefit of Taiwanese application no. 111124468, filed on Jun. 30, 2022. The entirety of the above-mentioned patent application is hereby incorporated by reference herein and made a part of this specification.

BACKGROUND

Technical Field

The disclosure relates to an image recognition technology. In particular, the disclosure relates to an object detection method and an electronic apparatus.

Description of Related Art

Object detection technology is one of the important fields in computer vision in recent years and also a challenging research. Object detection mainly aims to detect target objects in images, and locate a plurality of target positions and object types thereof in each picture. Object detection is mainly divided into two different implementations, and may be directly divided into one-stage object detection and two-stage object detection in terms of architecture and process. Two-stage object detection first selects a candidate region of the object, and then performs position detection and classification according to the candidate region. One-stage object detection performs object position detection and classification directly on the entire image.

With the rise of deep learning and the improvement of convolutional neural network (CNN), technologies related to object detection have also emerged and innovated, but the performance and effects of detection still need to face many challenges.

SUMMARY

The disclosure provides an object detection method and an electronic apparatus thereof, improving processing performance, improving precision in computation and inference, and ensuring generalization capability of models.

In an object detection method according to an embodiment of the disclosure, a processor is configured to perform the following: An original image is received. A plurality of initial feature layers of different scales is extracted from the original image. A plurality of fused feature layers of different scales is obtained through an interpolation and an addition operation based on the initial feature layers. The fused feature layers are respectively input into corresponding detection heads to obtain a bounding box location probability distribution through a bounding box regression branch of the detection head and obtain a classification probability distribution through a classification branch of the detection head.

An electronic apparatus according to an embodiment of the disclosure includes a storage device and a processor. The storage device includes an object detection module. The processor is coupled to the storage device. The processor is configured to input an original image into the object detection module and to: extract a plurality of initial feature layers of different scales from the original image; obtain a plurality of fused feature layers of different scales through an interpolation and an addition operation based on the initial feature layers; and respectively input the fused feature layers into corresponding detection heads to obtain a bounding box location probability distribution through a bounding box regression branch of the detection head and obtain a classification probability distribution through a classification branch of the detection head.

Based on the foregoing, an object detection method improved based on a convolutional neural network architecture and an electronic apparatus thereof are disclosed, integrating lightweight models with network acceleration strategies, and focusing on optimization on the inference speed during extraction of object information.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
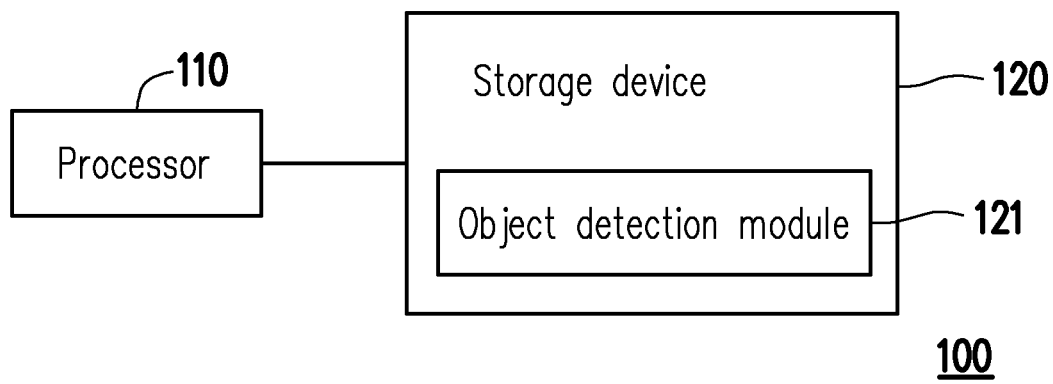
FIG. 1 is a block diagram of an electronic apparatus according to an embodiment of the disclosure.

FIG. 1 is a block diagram of an electronic apparatus according to an embodiment of the disclosure With reference to FIG. 1, an electronic apparatus 100 includes a processor 110 and a storage device 120. The processor 110 is coupled to the storage device 120. The storage device 120 includes an object detection module 121.

The processor 110 is, for example, a central processing unit (CPU), a graphics processing unit (GPU), a physics processing unit (PPU), a programmable microprocessor, an embedded control chip, a digital signal processor (DSP), an application specific integrated circuit (ASIC), or other similar devices.

The storage device 120 is, for example, any type of fixed or removable random access memory (RAM), read-only memory (ROM), flash memory, hard disk, or other similar devices or a combination of these devices. The object detection module 121 is composed of one or more code snippets. The code snippets are executed by the processor 110 after being installed.

Figure 2:
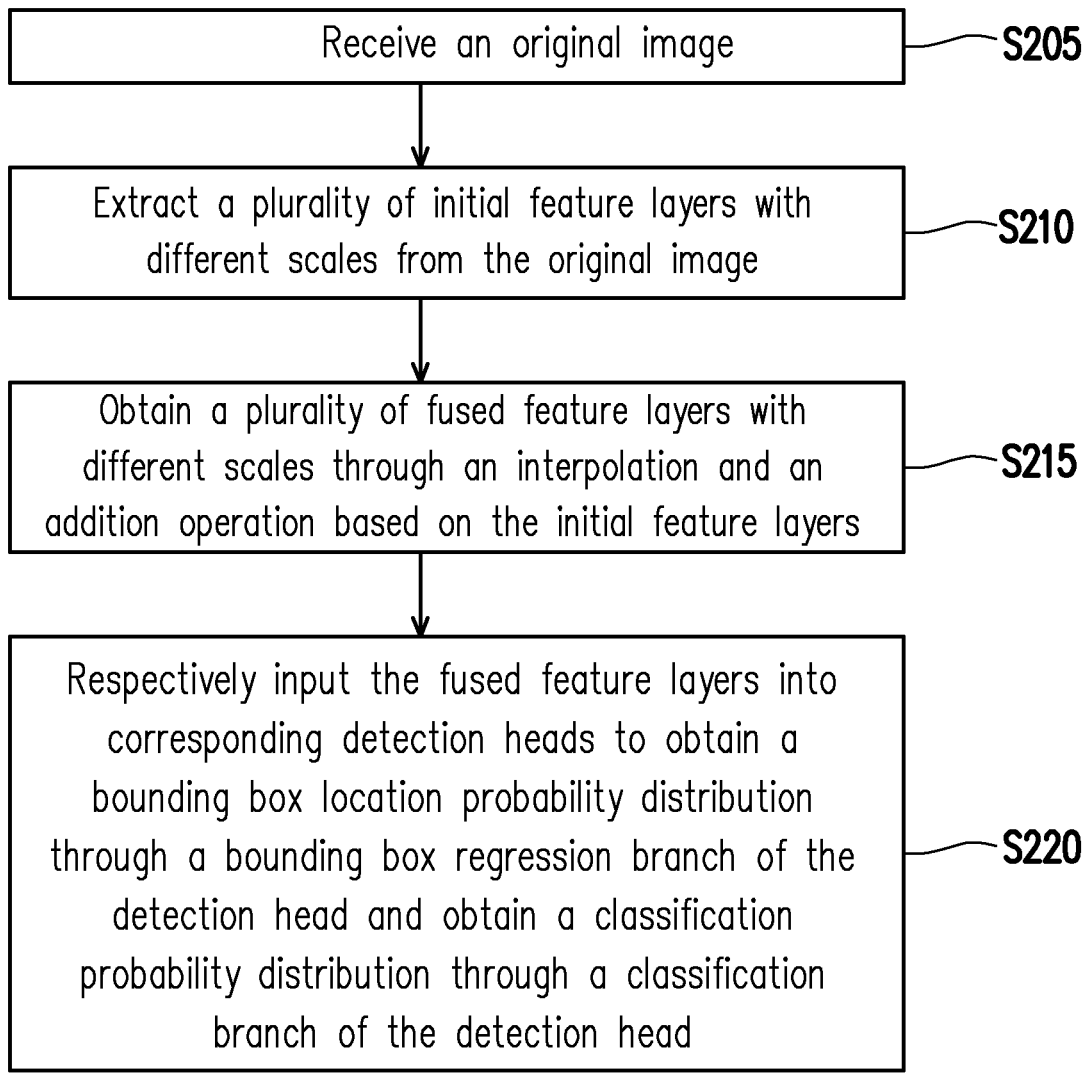
FIG. 2 is a flowchart of an object detection method according to an embodiment of the disclosure.

FIG. 2 is a flowchart of an object detection method according to an embodiment of the disclosure. In this embodiment, the processor 110 is configured to execute the object detection module 121 to implement steps S205 to S220 below. In step S205, an original image is received. Next, in step S210, a plurality of initial feature layers is extracted from the original image. For example, the original image is input into a backbone to obtain a plurality of initial feature layers of different scales. In step S215, a plurality of fused feature layers of different scales is obtained through an interpolation and an addition operation based on the initial feature layers. In step S220, the fused feature layers are respectively input into corresponding detection heads to obtain a bounding box location probability distribution through a bounding box regression branch of the detection head and obtain a classification probability distribution through a classification branch of the detection head.

Figure 3:
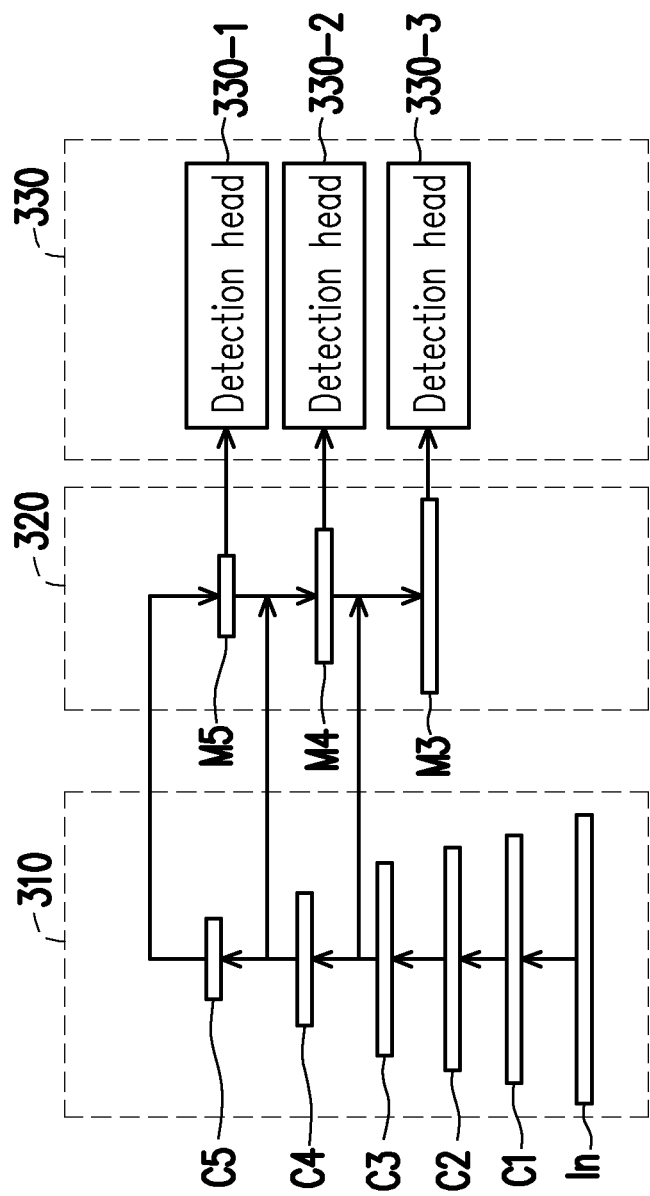
FIG. 3 is an architectural diagram of an object detection module according to an embodiment of the disclosure.

FIG. 3 is an architectural diagram of an object detection module according to an embodiment of the disclosure. With reference to FIG. 3, the object detection module 121 is an architecture based on a convolutional neural network (CNN), and is divided into three parts: a backbone 310, a neck 320, and a detection head 330. In this embodiment, three detection heads 330-1 to 330-3 are disposed correspondingly to the number of fused feature layers M3 to M5 output by the neck 320.

The backbone 310 serves for extracting features from an original image In. In this embodiment, the backbone 310 extracts a plurality of initial feature layers C1 to C5 of different scales from the original image In by downsampling. For example, 2×, 4×, 8×, 16×, and 32× downsamplings are respectively performed through feature maps of five different scales. Namely, assuming that the size of the original image In is H×W, then the feature layers C1 to C5 respectively obtain feature maps of sizes of H/2×W/2, H/4×W/4, H/8×W/8, H/16×W/16, H/32×W/32. For example, if the size of the original image In is 1024×2048, heights and widths corresponding to the feature layers C1 to C5 are respectively 512×1024, 256×512, 128×256, 64×128, and 32×64.

Models such as VGG, ResNet, ResNeXt, DenseNet, MobileNet, and ShuffleNet may be adopted for the backbone 310. In this embodiment, for example, EfficientNet-lite is selected as the model for the backbone 310. EfficientNet-lite is a lightweight, improved version of EfficientNet, in which the squeeze-and-excitation (SE) module is removed to ensure the lightweight level during scaling, improving the balance between precision and size. The neck 320 is a link in the object detection module 121, and serves to reprocess and reasonably utilize important features extracted by the backbone 310, facilitating specific tasks of learning of the detection head 330 subsequently.

In the neck 320, a structure of feature pyramid network (FPN) may be adopted to extract feature data of different scales on feature layers of different scales (i.e., different sizes) for fusion. Fully utilizing the feature data extracted by the backbone 310 facilitates subsequent object detection.

Modules such as adaptive spatial feature fusion (ASFF), receptive field block (RFB), and spatial pyramid pooling (SPP) may also be adopted for the neck 320. The neck 320 serves to integrate and extract the feature data provided by the backbone 310 for subsequent detection by the detection head 330, improving the performance of the model.

In this embodiment, an addition operation is performed on the initial feature layers C3 to C5 from a deep layer to a shallow layer by upsampling in the neck 320, and the fused feature layers M3 to M5 are obtained. An addition operation adds the feature maps without changing the number of channels.

Specifically, the initial feature layer C5 is taken as the fused feature layer M5. Next, after the height and width H/32×W/32 of the fused feature layer M5 are adjusted to be the same as the height and width H/16×W/16 of the initial feature layer C4 by an interpolation, an addition operation is performed on the fused feature layer M5 and the initial feature layer C4, and the fused feature map M4 is obtained. Then, after the height and width H/16×W/16 of the fused feature layer M4 are adjusted to be the same as the height and width H/8×W/8 of the initial feature layer C3 by an interpolation, an addition operation is performed on the fused feature layer M4 and the initial feature layer C3, and the fused feature map M3 is obtained. Here, the number of initial feature layers and the number of fused feature layers for feature fusion are only exemplary, and the disclosure is not limited thereto.

Figure 4:
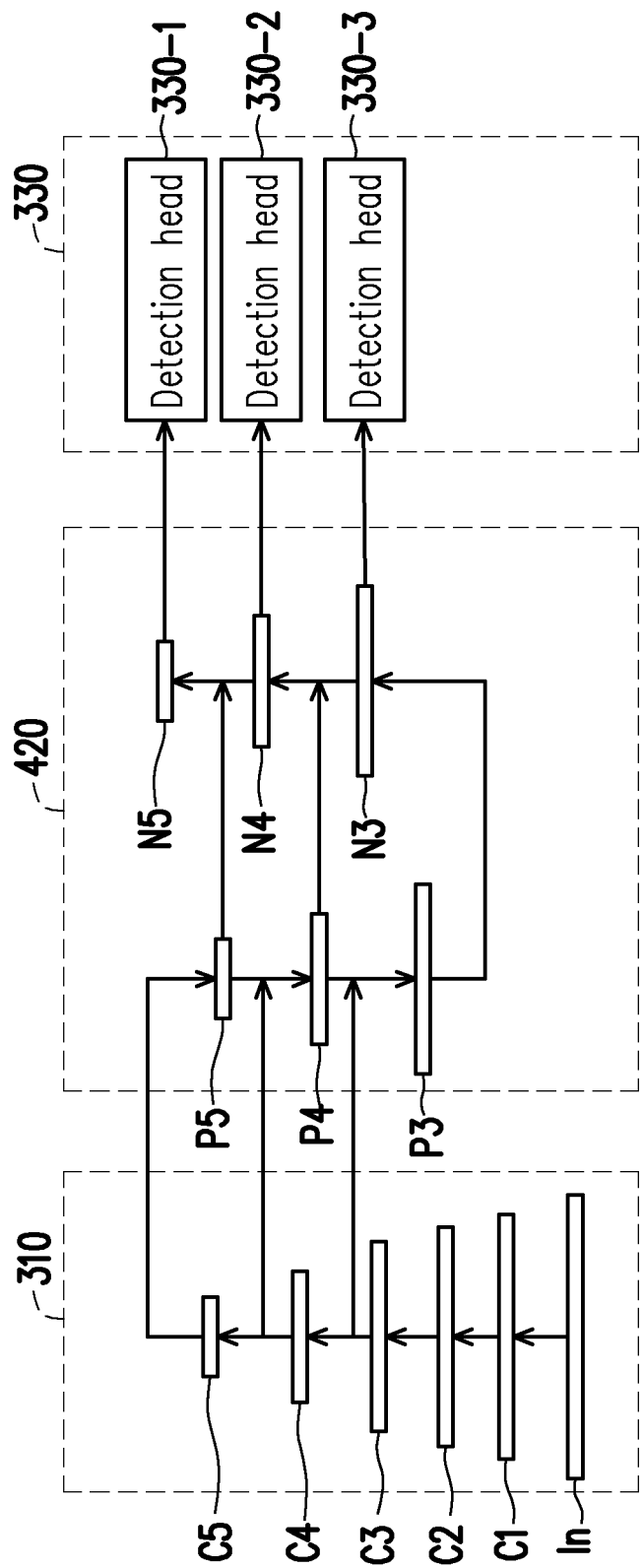
FIG. 4 is an architectural diagram of an object detection module according to another embodiment of the disclosure.

In another embodiment, two fusion paths may further be disposed in the neck, as shown in FIG. 4. FIG. 4 is an architectural diagram of an object detection module according to another embodiment of the disclosure. In this embodiment, a neck 420 is implemented with a path aggregation network (PANet), for example. The neck 420 shown in FIG. 4 has an additional bottom-up path compared with the neck 320 shown in FIG. 3. Namely, the neck 420 includes top-down and bottom-up paths. Fused feature layers P3 to P5 are obtained from the feature layers C3 to C5 through the top-down path, and fused feature layers N3 to N5 are obtained through the bottom-up path.

In this embodiment, in the top-down path, an addition operation is performed on the initial feature layers C3 to C5 from a deep layer to a shallow layer by upsampling, and the fused feature layers P3 to P5 are obtained. The initial feature layer C5 is taken as the fused feature layer P5, and the height and width of the fused feature layer P5 are adjusted to be the same as the height and width of the initial feature layer C4 by an interpolation. Next, after an addition operation is performed on the initial feature layer C4 and the fused feature layer P5, the fused feature layer P4 is obtained. Next, after the height and width of the fused feature layer P4 are adjusted to be the same as the height and width of the initial feature layer C3 by an interpolation, an addition operation is performed on the initial feature layer C3 and the fused feature layer P4, and then the fused feature layer P3 is obtained.

In the bottom-up path, an addition operation is performed on the fused feature layers P3 to P5 from a shallow layer to a deep layer by downsampling, and the fused feature layers N3 to N5 are obtained. The fused feature layer P3 is taken as the fused feature layer N3. Next, after the height and width of the fused feature layer N3 are adjusted to be the same as the height and width of the fused feature layer P4 by interpolation, an addition operation is performed on the fused feature layer P4 and the fused feature layer N3, and the fused feature map N4 is obtained. Then, after the height and width of the fused feature layer N4 are adjusted to be the same as the height and width of the fused feature map P5 by interpolation, an addition operation is performed on the fused feature layer P5 and the fused feature map N4, and the fused feature map N5 is obtained. Here, the number of initial feature layers and the number of fused feature layers for feature fusion are only exemplary, and the disclosure is not limited thereto.

In the neck 420, the up-and-down sampling convolution layer is omitted, and only a 1×1 convolution from feature extraction by the backbone 310 is reserved for alignment of feature channel dimensions, and both upsampling and downsampling are completed by an interpolation. Different from the concatenation operation adopted by YOLOv4, the addition operation serves to directly add feature maps of a plurality of scales. Accordingly, the calculation amount of the necks 320 and 420 may be reduced to the minimum.

Figure 5:
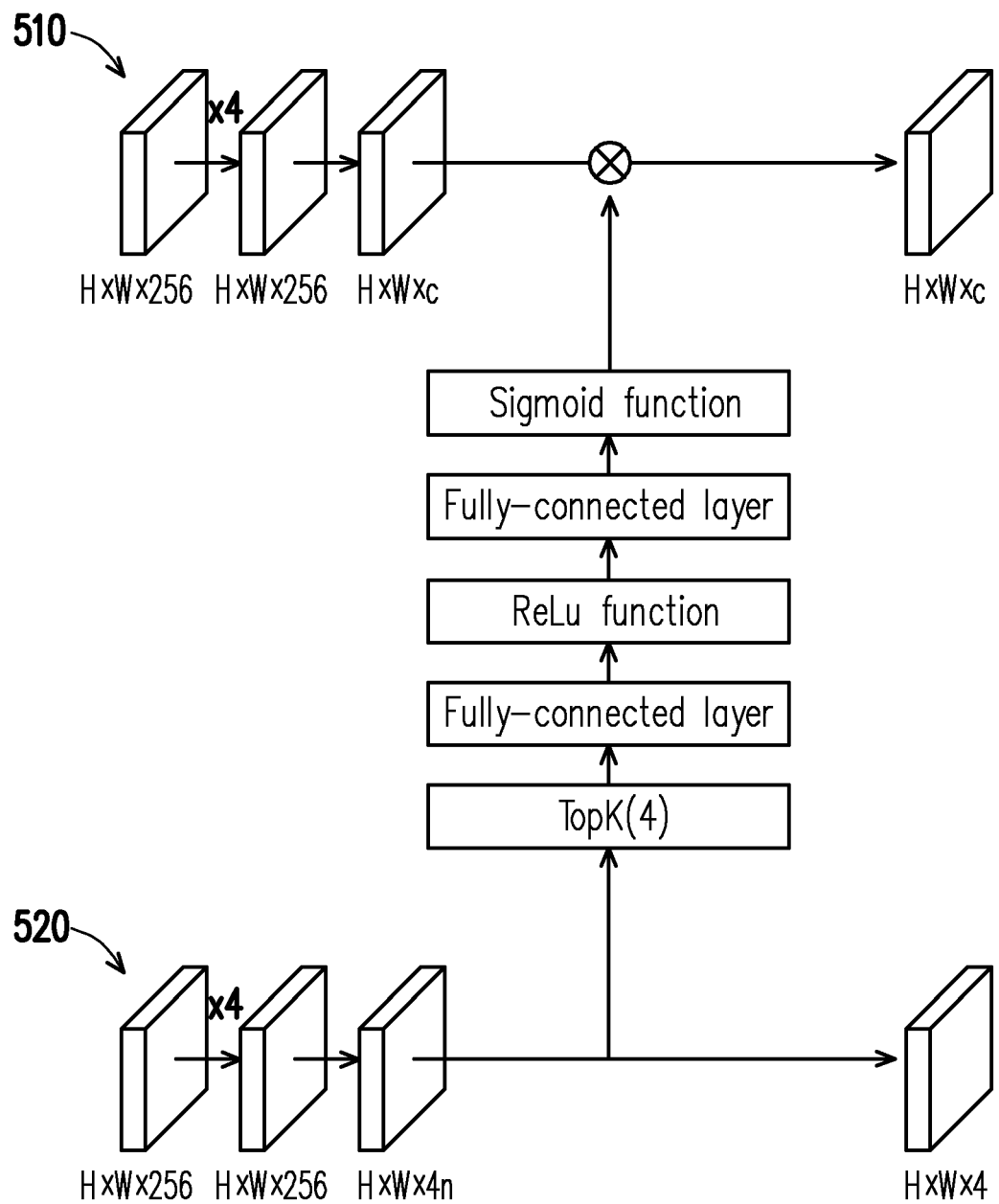
FIG. 5 is an architectural diagram of a detection head according to an embodiment of the disclosure.

In the detection heads 330-1 to 330-3, object classification and branch prediction of object locations are performed on the fused feature layers output by neck 320 (or the neck 420). FIG. 5 is an architectural diagram of a detection head according to an embodiment of the disclosure. With reference to FIG. 5, this embodiment is applicable to the detection heads 330-1 to 330-3 (collectively referred to as the detection head 330), for which a Generalized Focal Loss V2 (GFLv2) algorithm is adopted. Here, the detection head 330 includes a classification branch 510 and a bounding box regression branch 520. The classification branch 510 serves to obtain a classification probability distribution. The bounding box regression branch 520 serves to obtain a bounding box location probability distribution.

For the joint between the classification branch 510 and the bounding box regression branch 520, the TopK(4) function, rectified linear unit (ReLU) function, Sigmoid function, and two fully-connected (FC) layers respectively corresponding to the ReLU function and the Sigmoid function are adopted. The classification branch 510 and the bounding box regression branch 520 each use four convolutions with 256 channels. The Top-k values of the four sides of the bounding box are connected by the TopK(4) function to form a feature vector of a minimal dimension, and the feature vector is connected to two small FC layers. Accordingly, the calculation amount may be minimally increased, resulting in minimal computational burden to training or prediction, and further improving the prediction accuracy of the lightweight network.

In addition, in this embodiment, knowledge distillation is introduced into the bounding box regression branch 520. Knowledge distillation is a way of model compression, with the core idea of finding out a model that is simple but handles complicated issues. Knowledge distillation adopts the teacher-student model. After the teacher model is trained, the essence therein is selected as the training target of the student model, so that the student model brings achievements similar to the teacher model.

In the bounding box regression branch 520, localization distillation (LD) is adopted to improve the localization capability of target boxes. Localization distillation uses a high-performance teacher model that solves location ambiguity, so that the student model obtained through distillation learning solves location ambiguity similarly to the teacher model.

In the embodiment shown in FIG. 3 or FIG. 4, three detection heads are disposed corresponding to the output of the neck 320 or the neck 420. Finally, three sets of classification probability distribution and three sets of bounding box location probability distribution may be obtained.

During training of the object detection model 121, the EfficientNet-Lite algorithm with unified scaling capability is adopted in the backbone 310 for relatively great adaptability during research. After several times of fine-tuning, the activation function may be selected among ReLU6, Mish, LeakyReLU, and SiLU. The reason SiLU may be selected is that sparsity pruning is already adopted in the acceleration strategy. The properties of ReLU is that negative values are not retained during the training, which is likely to lead to vanishing gradients during training. After Mish and SiLU are tested, SiLU with better experimental data is taken as the activation function for training the backbone 310.

In addition, for lightweighting principles, the calculation layer for up-and-down sampling convolution is deleted on the basis of the original PANet, and a 1×1 convolution is instead adopted for alignment of feature channel dimensions, and the up-and-down sampling required for multi-scale fusion in the pyramid network is completed by a linear interpolation. Moreover, fully convolutional one-stage object detection (FCOS) with point assignment is adopted for the detection head to save invalid computation for configuring a great amount of anchors, one of the representations is adopted to scale the boundary from the center point to the surrounding detection boxes, and positive and negative samples are filtered through adaptive training sample selection (ATSS). Further, the Generalized Focal Loss V2 algorithm is introduced to modify the representation and the loss function (e.g., Focal Loss), the classification scores and detection box scores are combined into one representation, and a wide-range distribution obtained from learning is taken to substitute for the Dirac discrete distribution adopted in the original bounding box to adapt to relatively blur object boundaries in the actual image.

The lightweight object detection model may facilitate performance for mobile-end or terminal processing. In order not to excessively lower the accuracy in the pursuit of prediction speed, the object detection model in the proposed method achieves an accuracy of more than 47% AP50 and also a detection performance of more than 300 frames per second (FPS) utilizing normalized convolutional neural network (NCNN) and adopting NVIDIA RTX 2080Ti. AP50 is a target detection evaluation index, which refers to a threshold of intersection over union (IoU) greater than 0.5.

In the self-assessment experiments, EfficientNet-Lite® and EfficientNet-Lite1 were taken as the backbone 310. For adaptation during the experiment and balance between the experimental performance and the processing speed, the relevant experiments are as shown in Table 1.

TABLE 1

| | Experimental Group | | | | |
|---|---|---|---|---|---|
| | 1 | 2 | 3 | 4 | 5 |
| Backbone | Lite0 | Lite1 | Lite1 | Lite1 | Lite1 |
| Input size of original image | 320 | 416 | 416 | 416 | 416 |
| Activation function | ReLU6 | Mish | SiLU | SiLU | SiLU |
| Detection head | GFLv1 | GFLv1 | GFLv1 | GFLv2 | GFLv2 |
| Pruning | | | | ✓ | ✓ |
| Localization distillation | | | | | ✓ |
| Mixed precision training | | | ✓ | ✓ | ✓ |
| Performance index (mAP) | 24.7% | 27.35% | 27.61% | 29.72% | 30.7% |

Here, to take both the evaluation performance and the accuracy into account, the mean average precision (mAP) of COCO2017 Val is adopted as the performance index.

As shown in Table 1, in Experimental Group 1, EfficientNet-Lite® (abbreviated as "Lite0" in Table 1) was selected as the backbone, and a resolution of 320×320 (abbreviated as "320" in Table 1) was taken as the input size of the original image, ReLU 6 was adopted as the activation function, and the GFLv2 algorithm was adopted for the detection head, showing an mAP of 24.7%. In Experimental Groups 2 to 5, EfficientNet-Lite1 (abbreviated as "Lite1" in Table 1) was selected as the backbone, and a resolution of 416×416 (abbreviated as "416" in Table 1) was taken as the input size of the original image.

Compared with Experimental Group 4, the mAP of Experimental Group 1 is about 5% lower. In spite of the advantageous speed, the object detection module is still expected to achieve a certain accuracy and reduces the probability of erroneous determination or missed detection. In the tests of other experiments, the activation function was replaced, and different training strategies were adopted. Adoption of GFLv2 slightly improves the model size without greatly influencing the performance, and brings a positive influence on the accuracy.

In Experimental Group 2, Mish was taken as the activation function and the input size of the original image was increased to 416×416, showing an mAP about 2.6% higher compared with Experimental Group 1.

In Experimental Group 3, the activation function was replaced with SiLU and mixed precision training was added, showing a mAP improved by about 0.3% compared with Experimental Group 2. As can be seen, compared with adoption of Mish, mAP can be further improved in the case of partially reduced training precision combined with retained negative nonlinear activation function.

In Experimental Group 4, SiLU was adopted as the activation function and GFLv2 was taken as the detection head, and mixed precision training and sparse network pruning were added, showing a mAP increased by about 2.1% compared with Experimental Group 3, and increased by about 5% compared with Experimental Group 1. In Experimental Group 5, localization distillation was added on the basis of Experimental Group 4, and finally increased the mAP to 30.7%.

In summary of the foregoing, an object detection method improved based on a convolutional neural network architecture and an electronic apparatus thereof are disclosed, integrating lightweight models with network acceleration strategies, and focusing on optimization on the inference speed during extraction of object information. Although a lightweight network with fewer parameters is taken as the backbone, important features may still be obtained quickly from feature fusion through a bidirectional feature pyramid network when the scene or the object is relatively complicated. In addition, through training strategies such as integrated data enhancement, mixed precision training, and sparse network generation, it is possible to further effectively improve the generalization capability of the lightweight network, improve precision in computation and inference, and ensure generalization capability of the model.

Moreover, in the disclosure, knowledge distillation is adopted to address insufficient precision of the lightweight network in object detection, and effectively improve the inference accuracy of the student model through the mutual training of the teacher model and the student model, without increasing additional computational requirements during inference. Conventionally, less attention was paid to the computational cost of the algorithm. Therefore, through the lightweight network, a platform with relatively weak computing power can also perform object detection inference in real-time, which relatively effectively controls the hardware cost during subsequent applications in actual scenarios, and brings convenience to people's lives by employing deep learning in more scenarios.

In terms of verification of practical performance, in the disclosure, the public dataset MS-COCO 2017 was adopted for testing in comparison with the conventional techniques. Present in the test data are relatively difficult factors, such as blurred object boundaries, small objects, and overlapping objects in the real world. The results show that, the algorithm proposed by the disclosure achieve good accuracy and immediacy greater than the standard compared with the conventional techniques, and thus has the potential to be applied in real life, maintaining a certain accuracy while using relatively few computational resources.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An object detection method implemented by a processor configured to execute an object detection module, the method comprising:
   receiving an original image;
   extracting a plurality of initial feature layers of different scales from the original image through a sampling path, wherein the sampling path comprises a plurality of sampling steps, wherein an initial feature layer obtained from each of the plurality of sampling steps is taken as an input of next of the each of the plurality of sampling steps;
   obtaining a plurality of fused feature layers of different scales through an interpolation and an addition operation based on the initial feature layers through a fusion path, wherein the fusion path comprises a plurality of fusion steps, wherein a fused feature layer obtained from one of the plurality of fusion steps and an initial feature layer obtained from next of the one of the plurality of fusion steps are taken as an input of the next of the one of the plurality of fusion steps, wherein each of the plurality of fusion steps comprises:
      performing the interpolation on the fused feature layer taken as the input to adjust a size of the fused feature layer taken as the input to be the same as a size of the initial feature layer taken as the input; and
      performing the addition operation on the fused feature layer after adjusting the size and the initial feature layer to obtain a fused feature layer corresponding to the each of the plurality of fusion steps; and
   respectively inputting the fused feature layers into corresponding detection heads to obtain a bounding box location probability distribution through a bounding box regression branch of the detection head and obtain a classification probability distribution through a classification branch of the detection head.

2. The object detection method according to claim 1, wherein extracting the initial feature layers from the original image comprises:
   extracting the initial feature layers of different scales from the original image by downsampling.

3. The object detection method according to claim 1, wherein obtaining the fused feature layers of different scales comprises:
   performing the interpolation and the addition operation based on the initial feature layers from a deep layer to a shallow layer by upsampling, and obtaining the fused feature layers.

4. The object detection method according to claim 1, wherein after obtaining the fused feature layers, the method further comprises:
   performing the interpolation and the addition operation based on the fused feature layers from a shallow layer to a deep layer by downsampling, and obtaining a plurality of new fused feature layers to respectively input the new fused feature layers into the corresponding detection heads.

5. The object detection method according to claim 1, wherein the object detection module comprises a backbone, a neck, and the detection head.

6. The object detection method according to claim 5, wherein a lightweight neural network is adopted for the backbone, and the lightweight neural network comprises an EfficientNet-Lite algorithm.

7. The object detection method according to claim 5, wherein a path aggregation network is adopted for the neck.

8. The object detection method according to claim 1, wherein a Generalized Focal Loss V2 algorithm is adopted the detection head.

9. The object detection method according to claim 1, wherein knowledge distillation is introduced into the bounding box regression branch.

10. An electronic apparatus comprising:
a storage device comprising an object detection module; and
a processor coupled to the storage device, wherein the processor is configured to input an original image into the object detection module to:
extract a plurality of initial feature layers of different scales from the original image through a sampling path, wherein the sampling path comprises a plurality of sampling steps, wherein an initial feature layer obtained from each of the plurality of sampling steps is taken as an input of next of the each of the plurality of sampling steps;
obtain a plurality of fused feature layers of different scales through an interpolation and an addition operation based on the initial feature layers through a fusion path, wherein the fusion path comprises a plurality of fusion steps, wherein a fused feature layer obtained from one of the plurality of fusion steps and an initial feature layer obtained from next of the one of the plurality of fusion steps are taken as an input of the next of the one of the plurality of fusion steps, wherein each of the plurality of fusion steps comprises:
performing the interpolation on the fused feature layer taken as the input to adjust a size of the fused feature layer taken as the input to be the same as a size of the initial feature layer taken as the input; and
performing the addition operation on the fused feature layer after adjusting the size and the initial feature layer to obtain a fused feature layer corresponding to the each of the plurality of fusion steps; and
respectively input the fused feature layers into corresponding detection heads to obtain a bounding box location probability distribution through a bounding box regression branch of the detection head and obtain a classification probability distribution through a classification branch of the detection head.

* * * * *